United States Patent Office 3,316,223
Patented Apr. 25, 1967

3,316,223
NOVEL ANIONIC POLYMERS OF CERTAIN INSOLUBLE CROSSLINKED POLYMERS OF A pKa VALUE OF AT LEAST 16 AND ALKALI AND ALKALINE EARTH METALS
Massimo Baer, Longmeadow, and Michael J. Vignale, Lunenburg, Mass., assignors to Monsanto Company, a corporation of Delaware
No Drawing. Original application Oct. 20, 1959, Ser. No. 847,472, now Patent No. 3,079,428, dated Feb. 26, 1963. Divided and this application Aug. 8, 1962, Ser. No. 215,519
8 Claims. (Cl. 260—80.5)

This application is a division of our copending application, S.N. 847,472, filed October 20, 1959, now U.S. Patent 3,079,428.

This invention relates to insoluble polymeric anionic materials. More particularly, the invention relates to insoluble polymeric anionic materials which are useful as purifying agents for removing acidic impurities from organic liquids.

Because of the sensitivity of anionic polymerization systems to acidic impurities, i.e., proton donors, which destroy or consume the growing chains and initiator, solvents and monomers to be employed in such polymerization systems should be substantially free of impurities having a pKa value lower than that of the monomers to be polymerized, i.e., impurities which are more highly acid than the monomers. Many materials known to be capable of reacting with the acidic impurities cannot be used to purify the solvents and monomers, because in order to be suitable as a purifying agent in this application a material must satisfy these general requirements:

(1) It must be capable of removing the acidic impurities without contaminating the solvents and/or monomers with another impurity which reacts with anionic initiators, and (2) It must be inert to the liquid being purified, e.g., it must be incapable of initiating polymerization of the monomer being purified.

As used throughout the specification, terms referring to acidity should be understood as follows in the sense of the definitions derived from the proton-transfer theory of acids and bases:

(1) Acid—product obtained by adding a proton to a base, a base being any substance which, because of an unshared electron pair, can accept a proton, (2) Conjugate acid—acid related to particular base in being the product obtained by adding a proton to that base, (3) pKa value—negative logarithm of the dissociation constant of an acid.

It will be noted that, when understood in this sense, the term "acid" is not restricted to the inorganic, carboxylic, and sulfonic compounds conventionally designated as acids, i.e., compounds having low pKa values of up to about 10, but also embraces compounds of much higher pKa value.

One object of this invention is to provide means for purifying organic liquids of acidic impurities, i.e., impurities having a pKa value lower than that of the organic liquid.

Another object is to provide means for purifying organic liquids of acidic impurities without contaminating the liquids with other impurities capable of reacting with anionic polymerization initiators.

A further object is to provide means for purifying organic liquids of acidic impurities without causing reaction of the liquid being purified.

These and other objects are attained by purifying an organic liquid of acidic impurities by contacting the liquid with an insoluble polymeric anionic material which is inert to the liquid, said anionic material being an alkali metal salt or alkaline earth metal salt of an insoluble, cross-linked polymer containing a plurality of units capable of reacting with an alkali metal or alkaline earth metal to form an anion, the conjugate acid of said salt having a pKa value of at least 16.

The following examples are given to illustrate the invention. Parts mentioned are parts by weight.

*Example 1.—Preparation of purifying agent*

A suitable reaction vessel is charged with 300 parts of water, followed by addition of 1 part of bentonite with agitation. The slurry is heated to 65–70° C., and a mixture of 50 parts of vinyl fluorene, 40 parts of styrene, 10 parts of divinyl benzene, and 1 part of benzoyl peroxide is added thereto. The air in the vessel is purged with nitrogen, and the pressurized vessel contents are heated at 88–90° C. for 20 hours and then at 115–120° C. for 12 hours. The batch is cooled and discharged into a centrifuge where the suspension is collected and washed with hot water. The polymer beads are dried in a forced draft air oven for 12 hours at 110–120° C. and washed with 1,2-dimethoxyethane to form substantially pure beads of cross-linked vinyl fluorene-styrene-divinyl benzene (50:40:10) terpolymer.

A molar solution of sodium naphthalene in 1,2-dimethoxyethane is passed through a column containing the polymer beads in order to replace the active hydrogen atoms of the vinyl fluorene units with sodium. The effluent from the column, a solution of dihydronaphthalene and sodium naphthalene in 1,2-dimethoxyethane, is collected in a receiver. The treatment of the polymer with sodium naphthalene solution is continued until the concentration of sodium naphthalene in the effluent solution indicates no further capacity of the polymer to react with sodium. The column of beads is then washed with 1,2-dimethoxyethane to remove residual sodium naphthalene and dihydronaphthalene. The product of the treatment is an insoluble polymeric anionic material in which substantially all of the vinyl fluorene units of the cross-linked vinyl fluorene-styrene-divinyl benzene (50:40:10) terpolymer have been converted to the sodium salt.

The same procedure of interpolymerizing monomers by suspension polymerization to form beads of a cross-linked polymer and then reacting the beads with an alkali metal naphthalene to form an insoluble polymeric anionic material is used to prepare the following salts:

(1) Sodium salt of a styrene-N,N-diallylacrylamide (80:20) copolymer in which substantially all of the active hydrogen atoms of the N,N-diallylacrylamide units have been replaced with sodium.

(2) Lithium salt of a vinyl benzyl alcohol-divinyl benzene (90:10) copolymer in which substantially all of the active hydrogen atoms of the vinyl benzyl alcohol units have been replaced with lithium, (3) Lithium salt of a styrene-vinyl indene-divinyl benzene (60:30:10) terpolymer in which substantially all of the active hydrogen atoms of the vinyl indene units have been replaced with lithium, (4) Potassium salt of a styrene-vinyl fluorene-divinyl benzene (60:30:10) terpolymer in which substantially all of the active hydrogen atoms of the vinyl fluorene units have been replaced with potassium, and (5) Potassium salt of a p-aminostyrene-styrene-divinyl benzene (80:10:10) terpolymer in which substantially all of the active hydrogen atoms of the p-aminostyrene units have been replaced with potassium.

*Example II.—Purification of organic liquids*

Six organic liquids are purified, using the indicated insoluble polymeric anionic materials of Example I as purifying agents:

| Organic Liquid | Purifying Agent |
| --- | --- |
| Benzene | Na salt of vinyl fluorene-styrene-divinyl benzene (50:40:10) terpolymer. |
| 1,2-dimethoxyethane | Na salt of styrene-N,N-di-allylacrylamide (80:20) copolymer. |
| Methyl methacrylate | Li salt of vinyl benzyl alcohol-divinyl benzene (90:10) copolymer. |
| Styrene | Li salt of styrene-vinyl indene-divinyl benzene (60:30:10) terpolymer. |
| Butadiene | K salt of styrene-vinyl fluorene-divinyl benzene (60:30:10) terpolymer. |
| Isoprene | K salt of p-aminostyrene-styrene-divinyl benzene (80:10:10) terpolymer. |

In each case purification is accomplished by passing the organic liquid through a column of beads of the purifying agent, and in each case the effluent from the column is an unreacted organic liquid substantially free of acidic impurities.

*Example III. — Demonstration of effectiveness of purification*

A suitable reaction vessel is charged with half of a carefully-degassed solution of 100 parts of styrene in 980 parts of 1,2-dimethoxyethane, followed by the addition with agitation of half of a substantially pure, carefully-degassed solution of about 0.13 part of sodium naphthalene in 20 parts of 1,2-dimethoxyethane, an inert atmosphere being maintained in the vessel throughout the reaction. The reaction results in a small yield of polystyrene.

The second half of the carefully-degassed monomer solution described in the previous paragraph is passed through a column of beads of the sodium salt of the vinyl fluorene-styrene-divinyl benzene (50:40:10) terpolymer of Example I. The effluent from the column is charged to a suitable reaction vessel, followed by the addition with agitation of the second half of the substantially pure, carefully-degassed initiator solution, an inert atmosphere being maintained in the vessel throughout the reaction. The reaction results in substantially quantitative conversion of styrene to high molecular weight polystyrene.

The present invention relates to novel insoluble polymeric anionic materials and to their use as purifying agents for organic liquids containing acidic impurities.

The insoluble polymeric anionic materials are the akali metal salts and alkaline earth metal salts of insoluble, cross-linked polymers containing a plurality of units capable of reacting with an alkali metal or alkaline earth metal to form an anion, the conjugate acids of said salts having pKa values of at least 16.

Exemplary of known polymers which can be reacted with alkali metals or alkaline earth metals to form the purifying agents of the invention are copolymers of vinyl toluene, vinyl isopropyl benzene, vinyl benzyl alcohol, p-acetylstyrene, p-aminostyrene, vinyl pyridine, ethylenimine, or other polymerizable compound which, as a chemically-combined unit of a polymer, contains an active hydrogen replaceable with alkali metal or alkaline earth metal, or mixtures of such compounds, with one or more cross-linking agents such as divinyl benzene, divinyl toluene, divinyl xylene, divinyl ethylbenzene, diisopropenyl benzene, trivinyl benzene, divinyl naphthalene, trivinyl naphthalene, polyvinyl anthracene, etc., and optionally with one or more other interpolymerizable monomers, e.g., vinyl ethers, styrene, etc.

Other known polymers utilizable in preparing the purifying agents of the invention are copolymers in which the cross-linking agent, as a chemically-combined unit of a polymer, contains active hydrogen replaceable with alkali metal or alkaline earth metal. Such cross-linking agents are, for example, p-diallyl benzene, diallyl melamine, N,N-diallyl-acrylamide, allyl silanes, and the like, which in the course of polymerization leave residual unreacted allyl groups. These cross-linking agents are copolymerized with one or more monoethylenically-unsaturated copolymerizable monomers which may, if desired, also be monomers which, as a chemically-combined unit of a polymer, contain active hydrogen replaceable with alkali metal or alkaline earth metal. Alternatively, the cross-linking agent may constitute the only polymeric component capable of reacting with an alkali metal or alkaline earth metal to form an anion.

However, since the only requirement of the polymers with which alkali metal or alkaline earth metal is reacted to form the purifying agents of the invention is that they be insoluble, cross-linked polymers containing a plurality of units capable of reacting with alkali metal or alkaline earth metal to form an anion and that they have a pKa value at least as high as 16, and since monomers capable of contributing such units containing active hydrogen are already well known, various other polymers utilizable in preparing the purifying agents will be obvious to those skilled in the art. The polymers usually should contain about 1–40%, preferably 5–25%, by weight of units of the cross-linking agent and at least about 10% by weight of units capable of reacting with alkali metal or alkaline earth metal to form an anion. They can be prepared by any suitable polymerization technique, advantageously by suspension polymerization of the monomers to form polymer beads, as demonstrated in Example I, or by impregnating an inert carrier, e.g., silica gel, alumina, calcium sulfate, carbon black, diatomaceous earths, clays, etc., with the monomers and then polymerizing to form a thin coating of polymer on a large surface of the inert carrier.

The purifying agents of the invention are prepared by reacting these insoluble, cross-linked polymers with a metal or Group IA or IIA of the periodic classification of the elements, i.e., with Li, Na, K, Rb, Cs, Mg, Ca, Ba, or Sr, to replace the active hydrogen atoms of the polymer with metal, thus forming an insoluble polymeric anionic material. This reaction can be accomplished by contacting the polymer in any suitable manner with a solution or dispersion of the metal in an inert liquid medium or, more efficiently, by contacting the polymer with a solution or dispersion in an inert liquid medium of an organo-metallic compound of the metal whose conjugate acid is weaker than that contained in the insoluble polymer. Advantageously, the polymer is reacted with the metal by contacting it with a solution of an ion-radical adduct, e.g., sodium naphthalene, in a polar solvent such as 1,2-dimethoxyethane, as demonstrated in Example I.

The treatment of the polymer with the metal-containing composition is preferably continued until the capability of the polymer to react with the alkali metal or alkaline earth metal is exhausted in order to furnish the polymer with the maximum number of possible sites for subsequent reaction with acidic impurities contaminating the organic liquids to be purified. However, this exhaustion of the capability of the polymer to react with alkali metal or alkaline earth metal is obviously not required to make the polymeric anionic materials effective as purifying agents, particularly when the polymer contains a large number of units capable of reacting with alkali metal or alkaline earth metal. After completion of the treatment of the insoluble polymer with the alkali metal or alkaline earth metal, the polymeric anionic material is preferably washed with an inert solvent, e.g., liquid ammonia, to remove unreacted metal, metal compound, or residue of metal compound.

The insoluble polymeric anionic materials of the invention are effective as agents for purifying organic liquids of acidic impurities. The invention is particularly applicable to the purification of organic liquids to be employed in anionic polymerization systems, e.g., anionically-polymerizable vinylidene monomers such as styrene, vinyl toluene, o-, m-, and p-methoxystyrenes, butadiene, isoprene, methyl methacrylate, etc., or solvents such as benzene, hexane, tetrahydrofuran, 1,2-dimethoxyethane, etc., but it can also be applied to the purification of any organic liquid which is contaminated by impurities having a pKa value lower than that of the liquid.

Purification of the organic liquids is accomplished by contacting the liquid with the purifying agent in any suitable manner, advantageously by passing the liquid through a column of beads of the purifying agent, as demonstrated in Examples II and III. After being used to purify an organic liquid, the insoluble polymeric anionic material can be regenerated by repeating the metal treatment used in preparing the purifying agent.

Since the various organic liquids which can be purified of acidic impurities by the insoluble polymeric anionic materials of the invention have varying degrees of reactivity with anionic materials, care must be taken in the choice of a purifying agent for a particular organic liquid to insure removal of the acidic impurities without causing undesirable reaction of the lequid. The suitability of a particular insoluble polymeric anionic material as a purifying agent for organic liquids can readily be determined by routine experimentation, and in many cases this determination of the suitability of the anionic material is facilitated by the fact that the reactivity or lack of reactivity of many of the organic liquids with anionic materials of varying pKa values is already known. For greatest efficiency in removing acidic impurities, the purifying agent should have as high a pKa value as is consistent with the requirement that it be inert to the organic liquid being purified.

The invention is particularly advantageous in that it provides novel insoluble polymeric anionic materials which, when used as purifying agents for organic liquids, enable the removal from solvents and monomers of substantially all of the acidic impurities which interfere with anionic polymerization without contaminating the solvents and monomers with other impurities which would react with anionic initiators.

It is obvious that many variations may be made in the products and processes set forth above without departing from the spirit and scope of this invention.

What is claimed is:

1. An adduct of (a) a metal of the group consisting of alkali metaals and alkaline earth metals and (b) an insoluble, cross-linked polymer containing a plurality of units of a monomer of the group consisting of vinyl indene, vinyl fluorene, vinyl toluene, vinyl isopropyl benzene, vinyl benzyl alcohol, p-acetylstyrene, vinyl pyridine, ethylenimine, p-diallyl benzene, dially melamine, and N,N-diallylacrylamide, said polymer having a pKa value of at least 16 and at least about 10% by weight of units capable of reacting with alkali metal or alkaline earth metal to form an anion.

2. The adduct of claim 1 wherein the metal is lithium.
3. The adduct of claim 1 wherein the metal is sodium.
4. The adduct of claim 1 wherein the metal is potassium.
5. The adduct of claim 1 wherein the insoluble, cross-linked polymer is a vinyl fluorene-styrene-divinyl benzene terpolymer.
6. The adduct of claim 1 wherein the insoluble, cross-linked polymer is a styrene-N,N-diallylacrylamide copolymer.
7. The adduct of claim 1 wherein the insoluble, cross-linked polymer is a vinyl benzyl alcohol-divinyl benzene copolymer.
8. The adduct of claim 1 wherein the insoluble, cross-linked polymer is a styrene-vinyl indene-divinyl benzene terpolymer.

References Cited by the Examiner

UNITED STATES PATENTS

| | | | |
|---|---|---|---|
| 2,366,008 | 12/1944 | D'Alelio | 260—2.1 |
| 2,534,193 | 12/1950 | Emerson | 260—91.3 |
| 2,592,349 | 4/1952 | Skogseid | 260—2.1 |
| 2,663,702 | 12/1953 | Kropa | 260—2.1 |
| 2,903,440 | 9/1959 | Heiligmann | 260—88.1 |
| 3,055,860 | 9/1962 | Baer et al. | 260—88.2 |

FOREIGN PATENTS 616,134 1/1949 Great Britain.

OTHER REFERENCES

Kunin, Ion Exchange Resins, page 103, John Wiley, New York (1958) Library Call No. TP 156 I6 K8 (1958).

Parrish, Chemistry and Industry (London), page 137, Feb. 18, 1956 Library Call No. TP 1 S63.

WILLIAM H. SHORT, Primary Examiner.

SAMUEL H. BLECH, Examiner.

J. C. MARTIN, C. A. WENDEL, Assistant Examiners.